(No Model.)

C. A. G. STORZ.
HOSE PIPE COUPLING.

No. 489,107. Patented Jan. 3, 1893.

Witnesses:

Inventor.
Carl A. G. Storz.
by Herbert W. T. Jenner.
Attorney.

UNITED STATES PATENT OFFICE.

CARL AUGUST GUIDO STORZ, OF FRANKFORT-ON-THE-MAIN, GERMANY.

HOSE-PIPE COUPLING.

SPECIFICATION forming part of Letters Patent No. 489,107, dated January 3, 1893.

Application filed December 29, 1890. Serial No. 376,072. (No model.) Patented in Switzerland November 26, 1890, No. 3,134.

*To all whom it may concern:*

Be it known that I, CARL AUGUST GUIDO STORZ, engineer, a subject of the Grand Duke of Baden, residing at Frankfort-on-the-Main, in the Kingdom of Prussia and German Empire, have invented certain new and useful Improvements in Pipe or Hose Couplings, (for which I have obtained a patent in Switzerland, No. 3,134, dated November 26, 1890;) and I do hereby declare the following to be a full, clear, and exact description of the invention, such as will enable others skilled in the art to which it appertains to make and use the same.

This invention relates to couplings for pipes and particularly for hose pipes.

This invention consists in the novel construction and combination of the parts hereinafter fully described and claimed.

Figure 1:
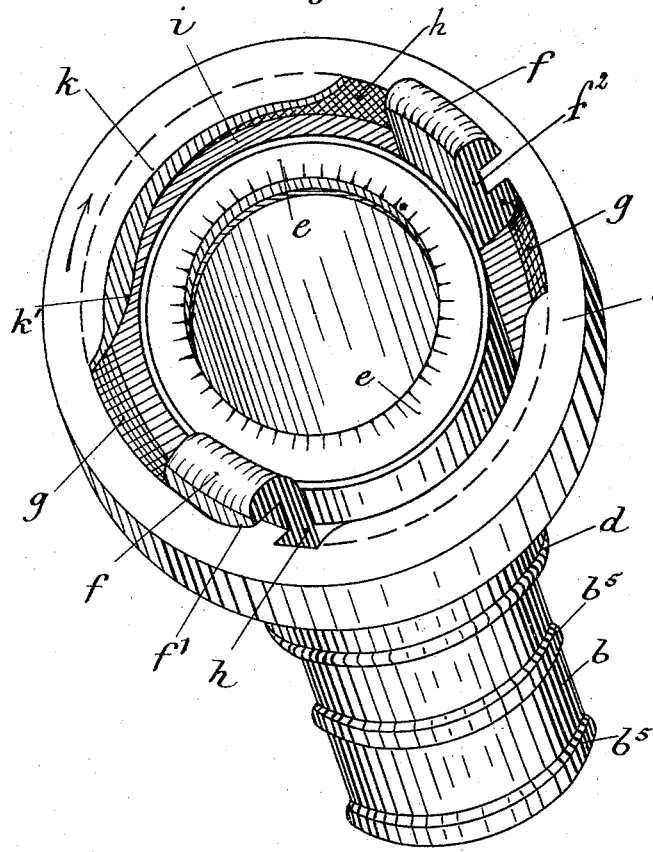
Figure 4:
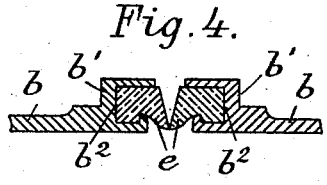
Figure 5:
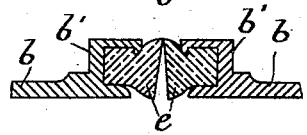
Figure 6:
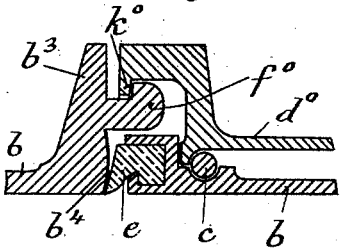
Figure 2:
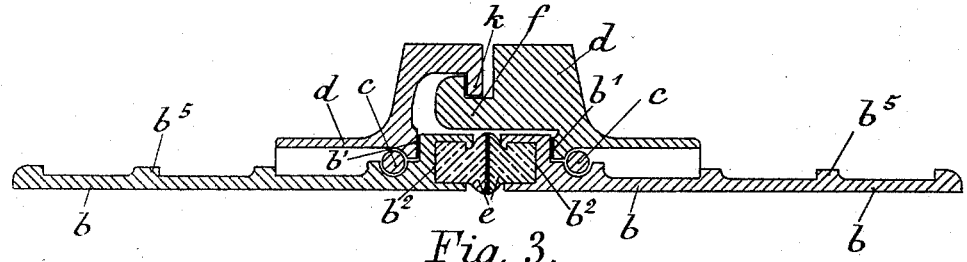
Figure 3:
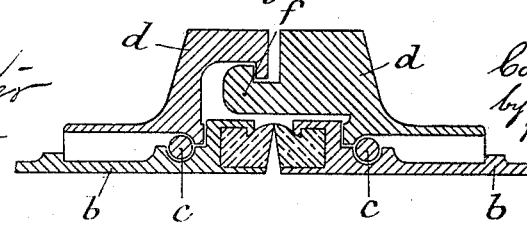

In the drawings: Figure 1 is a perspective view of one part of the coupling. Fig. 2 is a longitudinal section through one half of the two parts of the coupling when tightly connected. Fig. 3 is a similar longitudinal section showing a modification in the form of the packing rings and showing the parts before being tightly connected. Figs. 4 and 5 are longitudinal sections showing other forms of packing rings. Fig. 6 is a longitudinal section similar to Fig. 2, but shows a modification of the coupling.

Sleeves $b$ are adapted to be tightly secured to the hose pipes. These sleeves are both alike and are provided with ribs $b^5$ to prevent the hose from slipping off. Each sleeve $b$ is provided with a circular flange $b^2$, and $e$ is an elastic packing ring secured in a circular recessed groove in the face of the said flange. The recessed groove may be of any form that will hold the ring $e$ securely. The ring $e$ has an inclined face, and is wider on its face than where it enters the ring. When the parts of the coupling are tightly secured, the faces of the packing rings become flat as shown in Fig. 2, but the joint will be tight when the packing rings are gently pressed together without being flattened. The faces of the packing rings are inclined as shown in Fig. 4 when there is a pressure inside the pipe, and as shown in Figs. 3 and 5 when there is a partial vacuum inside the pipe. Fig. 5 shows the same form of packing rings, as shown in Fig. 2, before being squeezed flat. Rings $d$ are journaled on the sleeves $b$, and have shoulders $b'$ which bear against the flanges $b^2$. These rings are both alike, and each ring is kept from coming off by a circular split ring $c$. This ring $c$ is first expanded and sprung into a groove in the sleeve $b$, and is then compressed in the said groove until the shoulder $b'$ has been slid over it. The ring $c$ then expands behind the shoulder and holds the parts connected unless considerable force is used to get them apart. Each ring $d$ is provided with two hooks $f$ projecting from its face opposite each other, and has two lips $k$ between the said hooks. Small spaces $h$ are left on one side of the hooks, and spaces $g$ on the other side, the spaces $g$ being rather broader than the hooks so that when the parts of the coupling are pushed together the hooks $f$ may pass through the spaces $g$. The spaces $h$ are merely clearance spaces at the ends of the lips $k$, and may be dispensed with altogether if desired. The inner surface of each lip $k$ is inclined in opposite directions, the lip being thickest at the point $k'$ (see Fig. 1) a short distance from the opening $g$. The stems $f^2$ of the hooks turn in the spaces $i$, and the front edges $f'$ of the hooks are inclined to permit the hooks to engage readily with the lips $k$. When the parts of the coupling are pushed together, the rings $d$ are revolved until the hooks $f$ are under the parts $k'$ of the lips, and the faces of the packing rings are squeezed flat as shown in Fig. 2. The rings $d$ are then revolved to a limited extent in the same direction, thereby partially relieving the packing rings of pressure and allowing them to expand, but not sufficiently to break the joint. The parts of the coupling are locked by the action of moving the hooks past the point $k'$.

The arrow in Fig. 1 shows the direction in which the opposite ring of the coupling is revolved to connect the two parts.

In the modification shown in Fig. 6, only one of the sleeves $b$ is provided with a packing ring $e$, the opposed sleeve having a curved face $b^4$ for the ring $e$ to bear against, but both sleeves might have rings $e$ the same as shown in Fig. 4, if desired. In Fig. 6, a single ring $d^\circ$ is used and is provided with lips $k^\circ$ the same as shown in Fig. 2 and marked $d$ and $k$ respectively, but the ring $d^\circ$ has no hooks $f$. The hooks $f^\circ$ which engage with the lips $k^\circ$, are similar to the hooks $f$ but are formed on the sleeve $b$ instead of on a ring $d$, and the said sleeve is further provided with a flange $b^3$ for convenience in handling it.

What I claim is:

1. In a pipe coupling, the combination, with two sleeves adapted to be secured to the ends of the pipes, of a packing ring of elastic material provided with an inclined face and secured to one of the sleeves, and a ring journaled on one of the sleeves and provided with lips $k$ thickest at the points $k'$ and having their inner surfaces inclined in opposite directions from the said points and adapted to engage with hooks carried by the opposed sleeve, substantially as and for the purpose set forth.

2. In a pipe coupling, the combination, of two similar half couplings, each comprising a sleeve adapted to be secured to the end of the pipe, a packing ring secured to the sleeve and provided with an inclined face, and a ring journaled on the sleeve and provided with hooks $f$, spaces $g$ wider than the hooks, and lips $k$ thickest at the points $k'$ and having their inner surfaces inclined in opposite directions from the said points, substantially as and for the purpose set forth.

In testimony whereof I affix my signature in presence of two witnesses.

CARL AUGUST GUIDO STORZ.

Witnesses:
   ALVESTO S. HOGUE,
   JEAN GRUND.